United States Patent [19]

Brock

[11] Patent Number: 4,782,904
[45] Date of Patent: Nov. 8, 1988

[54] ELECTRONIC BALANCE

[75] Inventor: Christopher W. Brock, Morris Plains, N.J.

[73] Assignee: Ohaus Scale Corporation, Florham Park, N.Y.

[21] Appl. No.: 929,093

[22] Filed: Nov. 7, 1986

[51] Int. Cl.$^4$ .................. G01G 19/40; G01G 23/10
[52] U.S. Cl. ........................................ 177/25; 177/185
[58] Field of Search ............... 177/25.14, 185; 304/575, 734

[56] References Cited

U.S. PATENT DOCUMENTS

| | | | |
|---|---|---|---|
| 3,699,318 | 10/1972 | Underkoffler et al. | 235/151.1 |
| 3,709,309 | 1/1973 | Williams, Jr. et al. | 177/165 |
| 3,716,706 | 2/1973 | Gray | 235/151.33 |
| 3,790,910 | 2/1974 | McCormack | 235/151.3 |
| 3,869,005 | 1/1975 | Williams, Jr. et al. | 177/25 |
| 3,889,108 | 6/1975 | Cantrell . | |
| 3,916,107 | 10/1975 | McDonald . | |
| 4,023,098 | 5/1977 | Roth . | |
| 4,034,818 | 7/1977 | Matilainen | 177/25 |
| 4,056,737 | 11/1977 | Sequin . | |
| 4,063,604 | 12/1977 | Rock | 177/25 |
| 4,114,706 | 9/1978 | Realini et al. | 177/70 |
| 4,138,735 | 2/1979 | Alloca et al. | 364/900 |
| 4,139,070 | 2/1979 | Hanson et al. | 177/200 |
| 4,139,892 | 2/1979 | Gudea et al. | 364/567 |
| 4,156,472 | 5/1979 | Kunz | 177/25 |
| 4,157,738 | 6/1979 | Nishiguchi et al. | 177/1 |
| 4,159,521 | 6/1979 | Hall et al. | 364/466 |
| 4,171,026 | 10/1979 | Gallo et al. | 177/25 |
| 4,181,946 | 1/1980 | Loshbough et al. | 364/466 |
| 4,211,237 | 7/1980 | Nagel . | |
| 4,212,074 | 7/1980 | Kuno et al. | 364/567 |
| 4,219,089 | 8/1980 | Gard et al. | 177/165 |
| 4,231,439 | 11/1980 | Hall Jr. et al. | 177/185 X |
| 4,244,020 | 1/1981 | Ratcliff | 364/413 |
| 4,251,831 | 2/1981 | Kamath . | |
| 4,313,509 | 2/1982 | Engels | 177/50 |
| 4,328,874 | 5/1982 | Gumberich et al. | 177/25 |
| 4,379,495 | 4/1983 | Cocks et al. | 177/1 |
| 4,412,591 | 11/1983 | Reichmuth et al. | 177/1 |
| 4,432,009 | 2/1984 | Reitmeier et al. . | |
| 4,447,885 | 5/1984 | Biss | 364/568 |
| 4,458,267 | 7/1984 | Dolazza . | |
| 4,458,691 | 7/1984 | Netravali . | |
| 4,458,692 | 7/1984 | Simpson . | |
| 4,462,473 | 7/1984 | Valestin | 177/25 |
| 4,463,429 | 7/1984 | DeVale et al. | 364/466 |
| 4,477,713 | 10/1984 | Cook et al. . | |
| 4,481,587 | 11/1984 | Daniels, Jr. | 364/466 |
| 4,492,235 | 1/1985 | Sitrick . | |
| 4,502,555 | 3/1985 | Gower | 177/25 |
| 4,512,428 | 4/1985 | Bullivant | 177/25 |
| 4,525,794 | 6/1985 | Scheffer et al. | 364/567 |
| 4,528,584 | 7/1985 | Sabri . | |
| 4,535,854 | 8/1985 | Gard et al. | 177/1 |
| 4,535,857 | 8/1985 | Haze | 177/50 |
| 4,553,619 | 11/1985 | Fujinaga | 177/185 |
| 4,573,035 | 2/1986 | Dolazza . | |
| 4,573,070 | 2/1986 | Cooper . | |
| 4,611,674 | 9/1986 | Adachi et al. | 177/185 X |
| 4,649,482 | 3/1987 | Raviv et al. . | |
| 4,682,361 | 7/1987 | Selbach et al. . | |
| 4,704,632 | 11/1987 | Van Den Heuvel . | |

FOREIGN PATENT DOCUMENTS

| | | | |
|---|---|---|---|
| 1123211 | 8/1968 | United Kingdom | 177/185 |
| 1487829 | 10/1977 | United Kingdom | 177/185 |

Primary Examiner—George H. Miller, Jr.
Attorney, Agent, or Firm—Indyk, Pojunas & Brady

[57] ABSTRACT

A microcomputerized electronic balance has a digital filter which filters the output of a weight transducer in the balance. The filter changes the amount of filtering in response to the resolution of a display in the balance, the desires of the user of the balance as reflected by the state of a manual data entry means manipulated by the user, and the stability of the balance. Use of such filter results in a stable display of weight related data and good response time for the display.

19 Claims, 15 Drawing Sheets

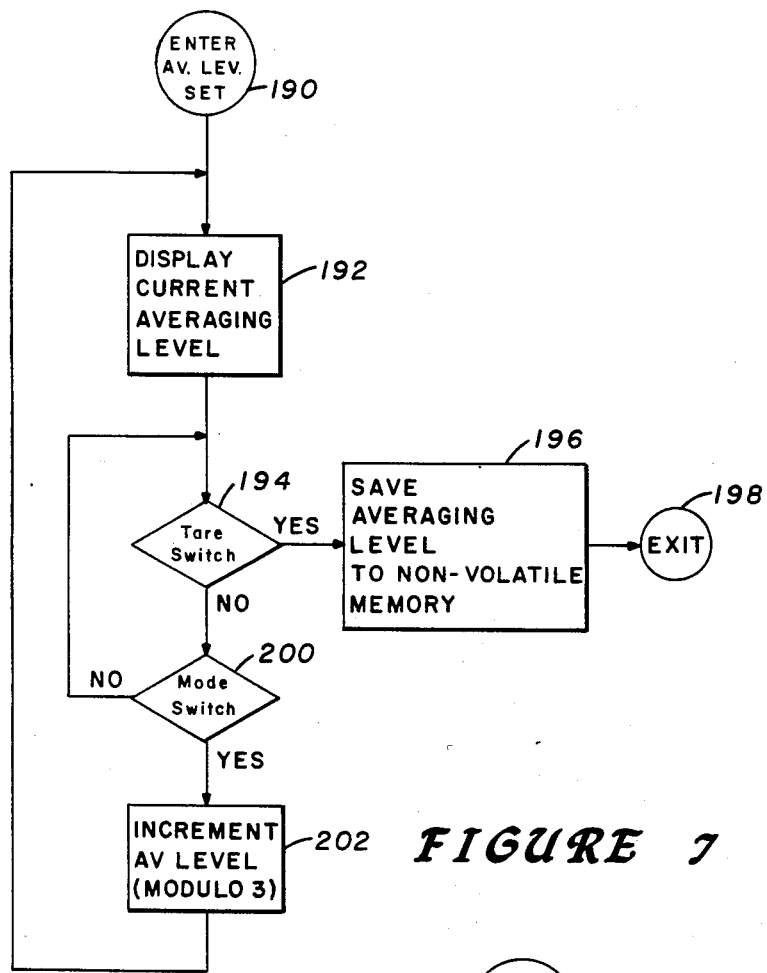
*FIGURE 7*
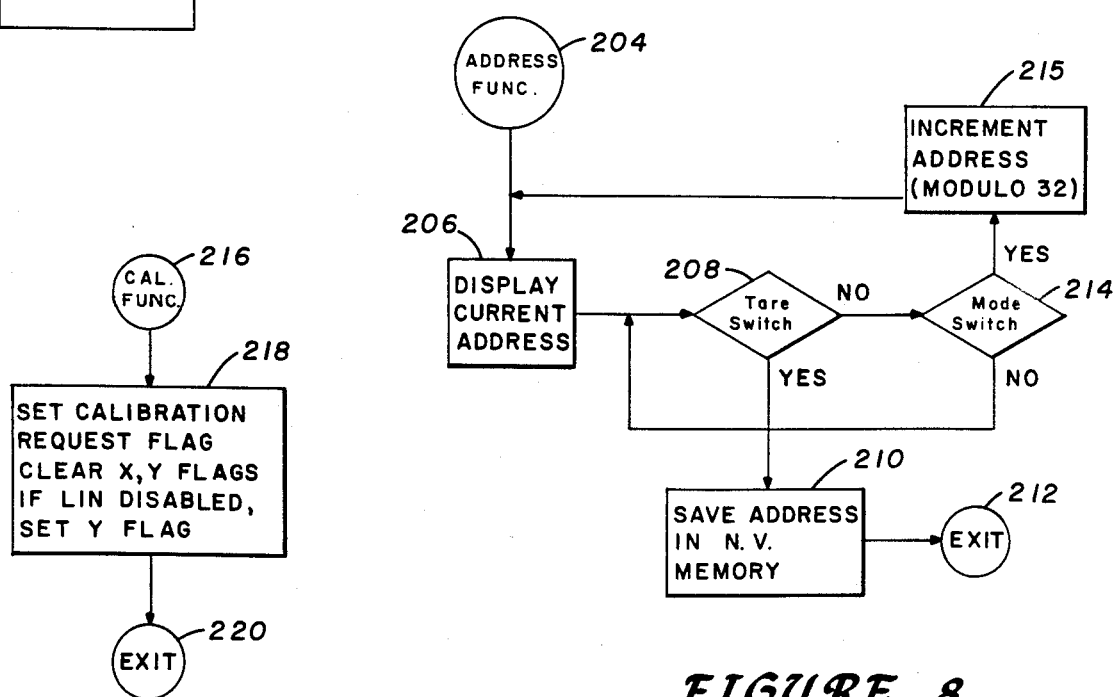
*FIGURE 9*
*FIGURE 8*

A = 3 PT. AVERAGE = AL$\phi$
B = 6 PT. AVERAGE = AL1
C = 12 PT. AVERAGE = AL2

ELECTRONIC BALANCE

FIELD OF THE INVENTION

This application relates to the field of electronic balances. More particularly, this application relates to a novel signal processing apparatus useful in an electronic balance.

BACKGROUND OF THE INVENTION

In recent years, electronic balances have become common in the field of precision weighing. Those balances employ a transducer which produces an analog voltage related to a weight placed on a weighing platform connected to the transducer. The analog voltage is converted to a digital signal which is manipulated by a signal processor. Among other things, the digital signal is suitable for use by an apparatus which displays a number related to the weight placed on the platform.

The transducer and the weighing platform are subject to a wide variety of disturbances. Those disturbances can result in an unstable display of weight fluctuations. These fluctuations make it nearly impossible to accurately determine the weight on the platform. Accordingly, various analog filtering techniques have been proposed to alleviate this problem. Various active and passive low pass analog filters have been used to prevent disturbances from affecting the weight display. These filters have been unsatisfactory because adequate analog filtering is costly and analog filtering does not lend itself well to changing the filtering characteristics based on operational conditions of the balance and the environment in which the balance is used.

Another approach is digital filtering which has been prompted by the proliferation of microprocessors and digital circuitry in the weighing industry. Hanson et al. U.S. Pat. No. 4,139,070 ("the Hanson patent") suggests a digital filtering technique which takes a moving average of the most recent eight weight samples to overcome this problem. This technique is unsatisfactory because the display is slow to respond to changes in weight on the platform caused by adding or removing weight from the platform. It also does not permit changing the level of filtering to accommodate environments having differing disturbance levels and to accommodate the different operational modes of the balance, such as whether or not the weight receiver is stable and the accuracy and resolution to which the scale displays weight-related data. Gumberich et al. U.S. Pat. No. 4,328,874 addresses this problem but only suggests a simplified system for manually changing the number of weight samples that are averaged. Although this is suitable in some circumstances and is a significant advance over other approaches tried in the past, it has been found that additional flexibility is needed for the multitude of environments and operating conditions encountered by today's electronic balances. A stable display with good response time is also needed.

Another attempt to solve the problems introduced by disturbances of the weighing platform involved a digital filtering technique of automatically changing the number of samples that were averaged, such change having been based upon whether the display was stable. If the display was stable, the filter would take a straight rolling average of a first predetermined number of the most recent samples. When the most recent sample differed from the display by more than a predetermined amount, thus indicating that the balance was unstable, the number of samples that was averaged was automatically reduced to a second predetermined number. The second predetermined number was determined by a manually selected averaging level similar to the one disclosed in the Gumberich patent. When the balance again became stable, i.e. the most recent sample differed from the display by less than the predetermined amount, the number of samples that were averaged was increased by one for each successive display update that the balance was stable until the number of samples in the average was returned to the first predetermined number where it remained until the balance again became unstable.

Applicant has found a way to improve upon this arrangement. Applicant has developed a digital filter useful in an electronic balance which is not only able to take into account the varying operational conditions of the balance and the changing environments in which the balance is used but also is able to provide a stable weight display with good response time.

In most cases, the weight on the platform is not a linear function of the analog output of the weight transducer. The signal processors in the prior balances have included a linearization circuit in an attempt to obtain a signal linearly related to the weight on the platform. For example, the Hanson patent refers to a routine for linearizing the output of the weighing system in accordance with the equation $WT' = WT + K(WT^2)$ where WT is the output of the weighing system, WT' is the linearized weight signal, and K is a linearity constant. The linearity constant is empirically determined for each transducer and loaded into the processor. Such empirical determinations are made with special test equipment under carefully controlled conditions before the transducer is assembled into a balance.

Recently, balances have been suggested which contain circuitry which calculates the linearity constants for the transducer directly from the output of the transducer after it has been assembled into the balance. Thus, there is no need to separately measure the linearity constants of each transducer before it is put into the balance and then to manually load those constants into memory. However, the transducers, and the weighing platforms to which they are connected, are subject to the same disturbances alluded to above, which can result in inaccurate data from the transducer output to the circuitry calculating the transducer linearity constant. Thus, unreliable data from the transducer can be filtered as has been done in the past, but as discussed above, insufficient attention has been directed to the apparently mutually exclusive goals of stability and response time, both goals to be achieved at a reasonable cost.

Accordingly, there is a need for a filtering arrangement in electronic balances, especially those employing linearization circuitry which calculates the transducer linearity constants from the output of the transducer installed in the balance using the balance's own circuitry.

SUMMARY AND OBJECTS OF THE INVENTION

The invention of this application addresses the conflicting problems of stability and response time in a balance employing filtering of the transducer output. It does this without complicated and expensive analog filters. It takes into account the operational conditions of the balance, for example, the display stability and resolution, and the filtering level desired by the operator. The invention accomplishes this by the provision of a novel signal processing means having a digital filter which comprises a means for repetitively sampling the magnitude of a digital signal related to transducer output, a means for storing predetermined ones of the sampled magnitudes, and an averaging means for generating a signal related to a weighted average of predetermined ones of the stored magnitudes. The digital filter may vary the weighting in the average of selected ones of the sampled magnitudes depending on the operational conditions of the balance or the desires of the user of the balance, or both. The operational conditions may be, for example, the stability of the weighing platform or display, the resolution of the display, or both. The operator can select a desired level of filtering by manipulation of a manual data entry means on the balance. Use of the digital filter of this invention results in a stable display with fast response to changes in weight on the weight receiver and an accurate linearization of the transducer output without the need for empirically determining the linearity constants of the transducer and manually loading them into the memory in the balance.

BRIEF DESCRIPTION OF THE DRAWINGS

FIGS. 4-9 and FIG. 9A are flow charts representing circuitry which processes operator instructions entered through a manual data entry means on the balance.

DETAILED DESCRIPTION OF THE PREFERRED EMBODIMENT

Figure 1:
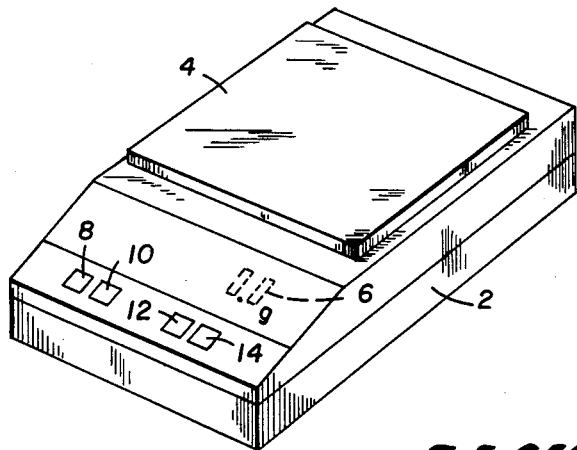
FIG. 1 is an external view of an electronic balance in accordance with this invention.

FIG. 1 shows the exterior features of an example of an electronic balance in accordance with this invention. The balance has a housing 2 enclosing an electromagnetic force restoration weight transducer and electronic circuitry responsive to the transducer. The electronic circuitry generates a signal related to weight suitable for display by the balance or transmission over a serial data communications channel to a remote computer or other peripheral. As described below, the electronic circuitry comprises a programmed microprocessor system in a preferred embodiment.

A rectangular weight receiver 4 is located on top of the balance and is connected to the transducer through an opening in the top of the housing. In normal operation, the balance displays by way of display 6 a number related to the weight of one or more objects placed on the weight receiver.

The balance has a manual data entry means comprising four manually operated push button switches, a PRINT switch 8, a MODE/UPDATE COUNT switch 10, an OFF switch 12, and an ON/REZERO or tare switch 14. Each of the switches has two states, an unactuated state and an actuated state. The actuated state is achieved by the operator manually pressing the switch. The switches are spring loaded so that the switch returns to its unactuated state once the operator releases the switch. An example of such a switch is a conventional membrane type switch. As discussed below, the electronic circuitry inside the balance responds to the actuation of the switches and enters a plurality of states depending upon the length of time and the number of times the switches are pressed by the operator.

Before the balance is operated, the calibration of the balance should first be checked. In other words, the balance should be checked to see that the balance displays correctly the weight of a known calibration weight. At the time of manufacture, the balance is calibrated, but such things as variations in the earth's gravitational field at different latitudes, handling during shipment, and changes in work location can affect the calibration. Accordingly, the balance may need recalibration.

The calibration is checked by placing a known weight on the weight receiver and checking the display to see if it displays the weight correctly. If the weight is not displayed correctly, the balance is calibrated as follows. The balance is turned on with no weight on the balance for a predetermined time, for example, thirty minutes, to allow the electronic circuitry to stabilize. The tare switch is then pressed until the balance enters the calibration mode. Entry into the calibration mode is displayed in any suitable manner on the display, such as by the appearance of the word CAL. The tare switch is then released and pressed momentarily once more. The display will then show a number corresponding to the weight of a calibration mass which then is placed on the balance. Momentarily pressing the tare switch stores in memory a value related to the signal produced by the weight transducer in response to placing the calibration mass on the balance. This value is used by the electronic circuitry in subsequent weighing operations so that the balance accurately displays a number relating to a weight placed on the balance. In a more sophisticated embodiment described below, the balance requests the user of the balance to place a second calibration mass on the balance. The balance then computes linearity constants for the transducer used in the balance.

In normal weighing operations, the balance weighs and displays numbers relating to weight placed on the balance. The weight placed on the balance may be from zero to a predetermined maximum capacity which can be, for example, 120 to 4000 grams. The display indicates the weight placed on the weight receiver to a predetermined resolution, precision, or accuracy. The display may, for example, display weight placed on the weight receiver to the nearest 0.0001 grams. In some embodiments, the balance weighs from zero to maximum capacity and displays the weight to a single accuracy. In other embodiments, the balance displays weight to greater accuracy in a lower portion of the weighing range from zero to maximum capacity and to lesser accuracy in the remainder of that range. This results in a fine range display for low weight and a coarse range display for higher weights.

When a balance having fine and coarse ranges is first turned on, it displays weights in the fine range. It continues to display weight in the fine range until the weight placed on the balance exceeds the capacity of the fine range. Then the balance automatically switches to displaying weight in the coarse range. When the weight on the balance again falls below the capacity of the fine range, the balance continues to display in the coarse range until the tar switch is pressed when once again the balance displays weight in the fine range.

To weigh an unknown mass, the tare button first is pushed. The balance initially energizes all display segments for a predetermined time, for example, three seconds, to alert the operator of the balance if all segments of the display are operating.

The balance then is zeroed by again pressing the tare button. This insures that the display reads zero when no weight is placed on the balance. The display then will indicate only the weight placed on the balance and will not reflect the weight of the weight receiver. To accomplish this, a value relating to the output of the weight transducer with no weight on the weight receiver is stored in memory and later subtracted from values relating to the output of the transducer during weighing operations.

An unknown mass then is placed on the weight receiver and the balance displays the weight in predetermied units. An indication of the predetermined units appears in the display when the weight reading is stable. Examples of predetermined units in which weight may be displayed are troy ounces, avoirdupois ounces, grams, carats, penny-weight, decimal pounds, parts counting, and user defined custom units.

The selection of the desired weighing unit in which the balance is to display the amount of weight placed on the weight receiver is accomplished by pressing the MODE/UPDATE COUNT switch until the symbol for the desired unit is displayed. Each time the MODE/UPDATE COUNT switch is pressed, the balance will change to display weight in a different unit selected from a fixed menu of units stored in the balance. Regardless of the unit selected, the balance will give an error message when the weight placed on the balance falls outside the balance's weight capacity. The balance also remembers the units in which it was last displaying weight when the balance is turned off (by pressing the OFF button). When the balance is turned on after such an occurrence, the balance resumes weighing in those units.

The balance is able to tare out the weight of a container holding material to be weighed so that the display indicates the net weight of the contents of the container. This is accomplished by zeroing the balance as described above and then placing an empty container on the balance and pressing the tare switch again. The container weight is stored in memory and later subtracted from further weighings so that only the weight of the contents of the container is displayed. Batching can be accomplished by repetitive taring until the capacity of the balance is reached.

As discussed in more detail below, the balance includes a circuit for digitally filtering the voltage output of the transducer so that stable weight related data can be displayed by the balance or transmitted to a computer or other peripheral. The user of the balance can select one of a predetermined number of filtering levels from a menu stored in the electronic circuitry of the balance. Such a selection depends on the desired level of display stability. That level of stability is dictated by the amount of disturbance of the balance's weight receiving means, such as that caused by excessive vibration.

In a preferred embodiment, the balance contains a menu of three filtering levels (AL0, AL1, and AL2). The user can select a desired level of filtering by pressing and holding the tare switch until the display shows "A.L.". When the tare switch is released, the previously selected filtering level will be displayed. The MODE/-UPDATE COUNT switch is then momentarily pressed successively to cycle through the available filtering levels which are successively shown on the display. When the desired filtering level is displayed, the tare switch is pressed and a digital word signifying the averaging level is written into a working memory and a non-volatile memory in the balance electronics. That digital word controls the level of filtering provided by a digital filter as described in more detail below.

The balance of FIG. 1 also is able to display the number of similar parts which are placed on the weight receiver when the balance is in a parts counting mode. To enter the parts counting mode, the MODE/UPDATE COUNT switch is pressed momentarily and repeatedly until the display indicates that the balance is in the parts counting mode, such as by displaying "PC". Shortly after the indication that the balance is in the parts counting mode, a number of the parts should be placed on the weight receiver. When that number of parts is placed on the weight receiver, the MODE/UPDATE COUNT switch is pressed. The balance then calculates the piece weight by dividing the measured weight by the number of parts placed on the weight receiver. The result is then stored in memory for later use by the balance when an unknown number of such parts is placed on the weight receiver and it is desired to ascertain the unknown number. The parts counting mode is exited by pressing the MODE/UPDATE COUNT switch until an exit indication appears on the display. The MODE/UPDATE COUNT switch is then pressed momentarily to select the next mode in the menu.

Examples of balances having the functions and structure described above in connection with FIG. 1, with the exception of the novel digital filter described below, are balances manufactured and sold by Ohaus Scale Corporation under the GALAXY trademark.

Figure 2:
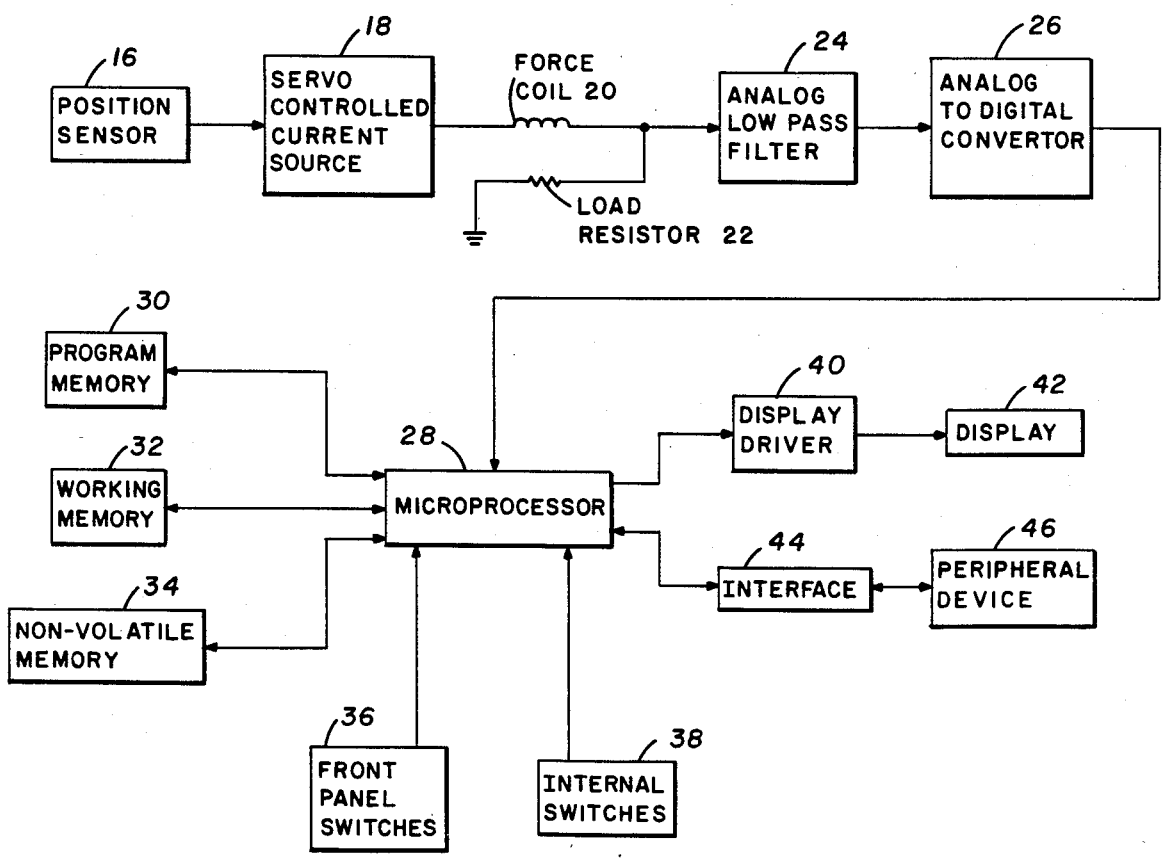
FIG. 2 is a schematic diagram of the electronic circuitry in a balance constructed in accordance with this invention.

FIG. 2 shows the circuitry used to implement this invention in the environment of an electronic balance. The circuitry comprises a position sensor 16 which generates an electrical signal in response to movement of the weight receiver 4 from the position it has when no weight is placed on the balance ("the no load position"). That electrical signal drives a servo controlled current source 18 which regulates the current flowing in a force coil 20.

With no weight on the weight receiver, the current source 18 maintains a current through the force coil 20 which interacts with a magnetic field produced by a permanent magnet inside the balance such that a force is produced on the weight receiver to suspend it in the no load position. When a weight is placed on the balance, the weight receiver is deflected downwardly away from the no load position. The position sensor then generates an electrical signal in response to movement of the weight receiver. The current source responds to that signal and adjusts the level of current flowing in the force coil such that an upward force is imparted to the weight receiver, such upward force exactly balancing the weight placed on the balance and returning the weight receiver to the no load position.

A load resistor 22 is connected in series with the force coil. The voltage at the junction of the load resistor and force coil is proportional to the current flowing in the force coil and is related to the weight placed on the balance. Such a weight relationship can be represented by a polynomial function. To a first approximation, such polynomial function is a quadratic function of current. The junction of the load resistor and force coil is connected to the input of an analog low pass filter 24 which removes high frequency noise from the analog signal related to weight. The output of the low pass filter is connected to the input of an analog to digital converter 26 which converts the analog weight related signal at the output of the low pass filter to a digital word related to the weight of the balance. The digital word is fed to the input of a signal processor which in a preferred embodiment is a microprocessor 28. The processor periodically samples the magnitude of the digital word and manipulates it so that it is suitable for display by the balance as weight related data or for transmission to peripheral devices.

The circuitry discussed thus far is shown in schematic form in FIG. 2 and has been described above in general terms because the details of that circuitry are well-known to those skilled in the weighing and electronics arts. Those details are not material to this invention and can be modified without affecting the results achievable with this invention. For example, a strain gauge transducer could be substituted for the electromagnetic force restoration transducer. If a force restoration transducer were to be selected, various forms of position sensors could be used. For example, those using light emitting diodes and photocells connected to a differential amplifier arrangement feeding current to the force coil may be used. Any low pass filter capable of removing unwanted noise signals from the weight related signal can be used. Any analog to digital converter capable of converting an analog weight related signal to a digital representation of that signal can be used with equal benefit. For example, the analog to digital converters described in the Gumberich patent or used in the GALAXY brand balances mentioned above would be suitable.

The microprocessor is connected to a program memory 30, a working memory 32, and a non-volatile memory 34 through data and address busses. The microprocessor and working memory may be any commercially available devices of that nature, such as an Intel 8049 microprocessor chip with an Intel 8155 expansion chip providing additional random access memory and input/output capability and a 14-bit timer. The program memory may be an intel 2732 eraseable programmable read only memory (EPROM) and the nonvolatile memory may be a National Semiconductor NMC 9306 electrically eraseable programmable read only memory (EEPROM).

The front panel switches 36 are connected to the input of the microprocessor. A number of switches 38 situated inside the balance housing are also connected to input of the microprocessor. These internal switches are each two position slide or DIP switches. Those switches determine (a) the modes settings available to the user through the front panel switches, (b) whether span calibration alone or span and linearity calibration are available to the user through the front panel switches, (c) whether the user can change the filtering level of the balance, (d) the sample size to be used to set up the balance for parts counting operation, (e) whether the display is blanked during unstable operating conditions, and (f) whether the calibration routines are available to the user through the front panel switches.

The microprocessor output is connected to the input of a vacuum fluorescent display driver 40 which may be a Sprague 4815 integrated circuit. The display driver 40 conditions the digital output of the microprocessor and periodically makes available to a vacuum fluorescent display 42 a digital word related to the weight placed on the balance. The display driver matches the level of the microprocessor output with the requirements of the display 42. The output of the driver is connected to the input of the display which provides a visual indication of the weight on the balance. Because the microprocessor provides weight related data on a periodic basis, the display is updated at discrete update times.

The microprocessor is connected to a serial data communications interface 44 which may be an RS-232 interface. The interface 44 is connected to a peripheral device which receives weight related data from the balance via the interface 44 and which sends commands to the balance via that interface. The peripheral device may be a host computer controlling the balance as one of a number of such balances in a multiple balance system which may be used in a manufacturing facility.

FIGS. 3A, 3B, 4–9, 9A, and 10–16 are flow charts representing the electronic processing circuitry in the balance. That circuitry may be implemented in the form of hardware or in the form of a program in a computer system. It is preferred that the circuitry be implemented as a program in the commercially available microprocessor system described above. A specific program is not described in this application because it is not believed critical to the carrying out of this invention and because it is believed that a person skilled in the computer programming and weighing arts could readily develop such program in light of the information given in this application and in light of well-known instruction sets and programming techniques available for commercially available microprocessor systems.

Figure 3A:
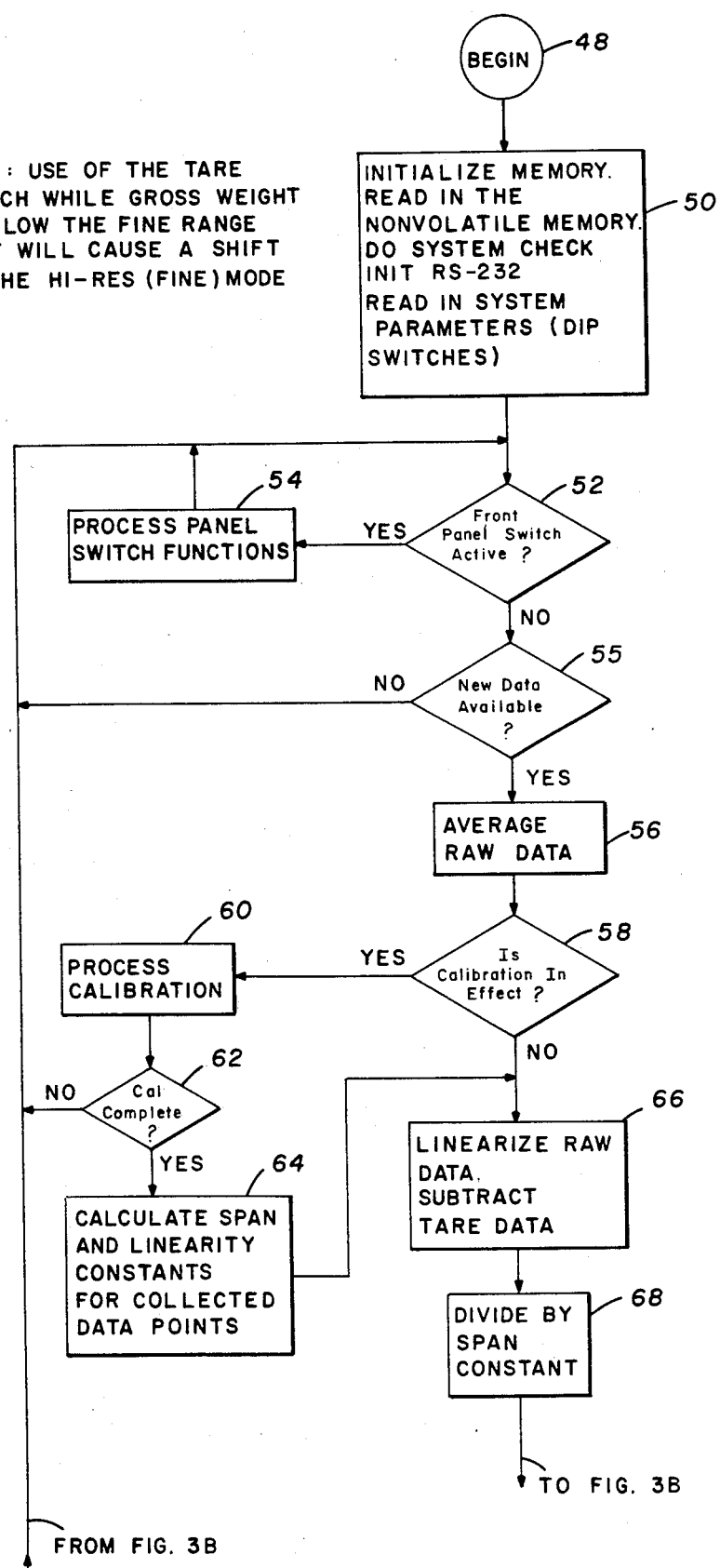
FIGS. 3A and 3B are flow charts representing the circuitry of a balance in accordance with the invention of this application in terms of the overall sequence of operations performed by that circuitry.
Figure 3B:
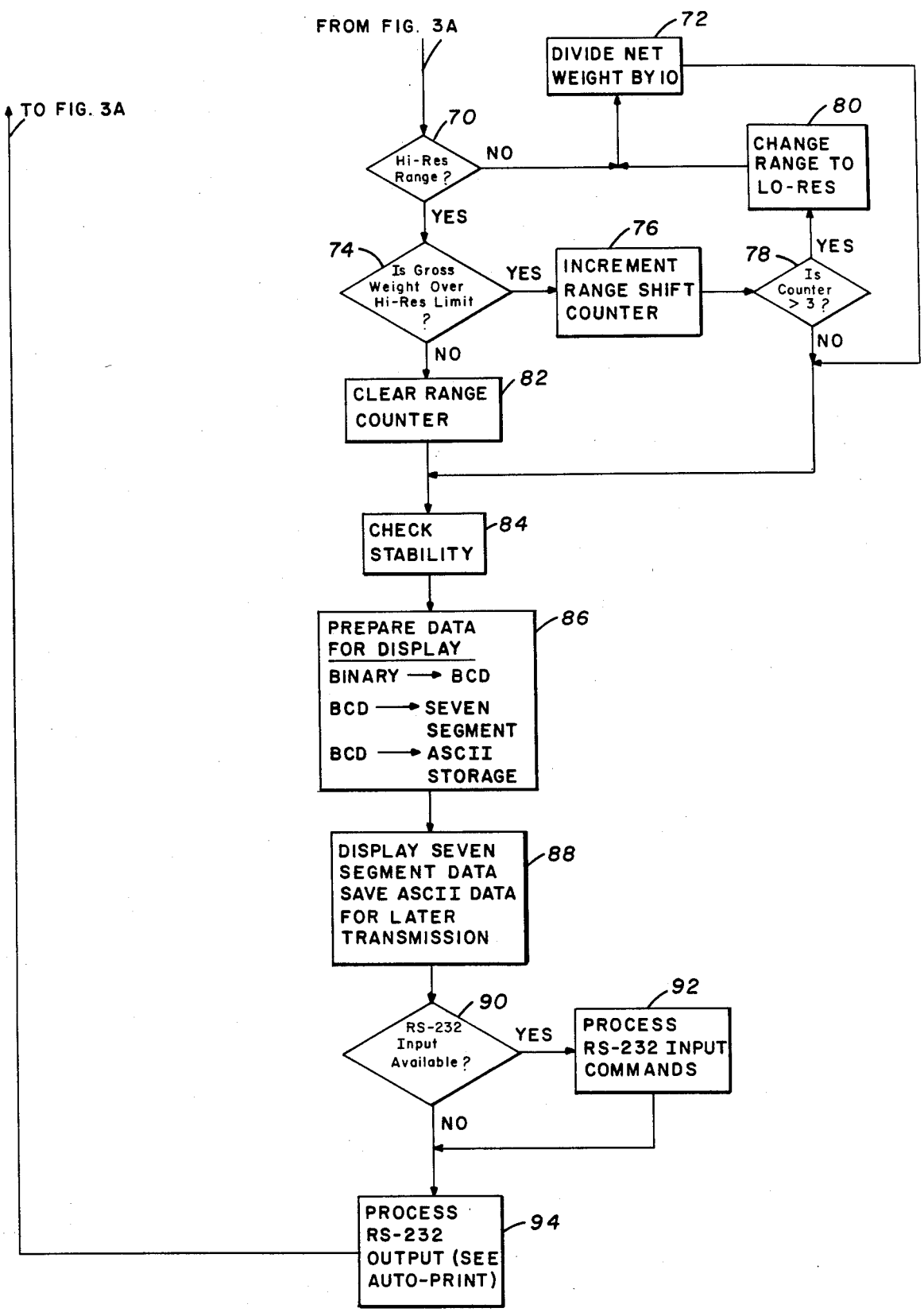

FIGS. 3A and 3B is a flow chart showing the overall sequence of operations of the processing circuitry in the balance. The sequence begins at block 48 and proceeds to block 50 where the working memory and the RS-232 interface are initialized and a standard computer system check is performed. Once this has been completed, data in the nonvolatile memory and system parameters (the stae of the DIP switches, for example) are read into the working memory.

The front panel switches are then queried at block 52 to see if any functions controlled by those switches need to be performed. If the front panel switches are being actuated by the balance operator, the functions requested by the operator are performed at block 54 and the sequence loops back to the input of block 52. When there are no front panel switch functions to be performed, the circuitry checks at block 55 if new weight related data is being fed to the processing circuitry from the analog to digital converter. If not, the sequence loops back to the input of block 52.

If new data is available, that data is filtered in block 56 in accordance with a novel digital filtering routine described fully below. More specifically, raw weight related data from the analog to digital converter 26 is averaged using a novel averaging routine described below.

After the data has been filtered, the circuitry checks to see if the balance is in the calibration mode at block 58. If so, the circuitry prompts the balance operator at block 60 to place known calibration weights on the weight receiver. The circuitry then checks to see if calibration has been completed at block 62. If not, the sequence loops back to the input of block 52. If the calibration has been completed, then the span and linearity constants for the weight transducer are computed by the circuitry at block 64 and stored in the nonvolatile memory 34.

After those constants have been computed and stored in memory, the circuitry linearizes the filtered raw data using the linearity constants stored in memory and subtracts any tare data which may also be stored in memory at block 66. The result of the operations in block 66 then is divided by the span constant in block 66 to obtain a net weight signal.

The output of block 68 is connected to the input of block 70 where the balance is queried as to whether the display is in the high resolution mode or fine range. If the display is not in a high resolution mode, the net weight from block 68 is divided by 10 and the decimal point is shifted one place to the right in the display which in effect reduces to number of significant places to which the net weight is displayed. After division of the net weight in block 72, the net weight is displayed with low resolution, in a coarse range, or with reduced number of significant places through the operation of blocks 84, 86, and 88 connected to the output of block 72.

If the query in block 70 indicates that the balance is displaying weight in a high resolution mode, a determination then is made, at block 74, whether the gross weight on the balance is greater than a predetermined value, the high resolution limit or capacity. If so, a range counter is incremented at block 76 and a check is made at block 78 to see if the range counter has a count greater than three. If the count is greater than three, then the resolution of the balance is changed to the low resolution mode or coarse range at block 80, the net weight is divided by the predetermined number at block 72, the decimal point is shifted to the right, and the net weight is displayed with low resolution or in a coarse range as explained before. If the count of the counter is three or less, then the net weight is displayed with high resolution through the operation of blocks 84, 86, and 88 connected to the output of block 78. When the gross weight on the balance exceeds the high resolution limit for a period of time permitting the range counter to reach a count of more than three as the circuitry repeats the sequence of operations shown in FIGS. 3A and 3B, then the balance switches from the high resolution mode to the low resolution mode. The range counter and blocks 76 and 78 in effect insert a time delay between the time the gross weight exceeds the high resolution limit and the time the balance switches to the low resolution mode from the high resolution mode. This prevents needless switching between modes caused by temporary disturbances of the weight receiver.

If the gross weight is not over the high resolution limit such query is made in block 74, the range counter is cleared at block 82.

Regardless of whether the balance is in the high or low resolution modes, the stability of the balance is checked before the net weight is displayed. This is accomplished in block 84 the input of which is connected to the outputs of blocks 72, 78, and 82. The balance is considered stable if a predetermined number of consecutive weight displays are within predetermined limits. For example, stability may be defined as three consecutive weight displays within one least significant digit of each other. If it is determined that the balance is unstable, then the display of weight is indicated as unstable.

Weight related data is prepared for display at block 86. Up to this point, the data has been in binary form. The data is first converted into binary coded decimal form. In order to display the data on the seven segment display, the binary coded decimal data is converted into seven segment code suitable for the display. In order to transmit the data via a serial data communications channel, the binary coded decimal data is converted to ASCII format.

At block 88, the balance circuitry displays the seven segment data on display 42 using the decimal point location (actually determined in block 70 where it is determined whether or not the balance is in the fine or coarse range). Block 88 also causes the ASCII data to be saved in memory for later transmission over a serial data communications channel via RS-232 interface 44.

The circuitry checks the RS-232 interface at block 90 to see if any input commands from external peripherals are present. If so, the circuitry of the balance processes those commands at block 92. If no RS-232 input commands are present or if they are present and they have been processed, then the circuitry in the balance processes any data output to be sent by the balance to external peripherals at block 94. After such output data processing, the sequence of operations of the balance circuitry returns to block 52 where the sequence begins again.

Figure 4:
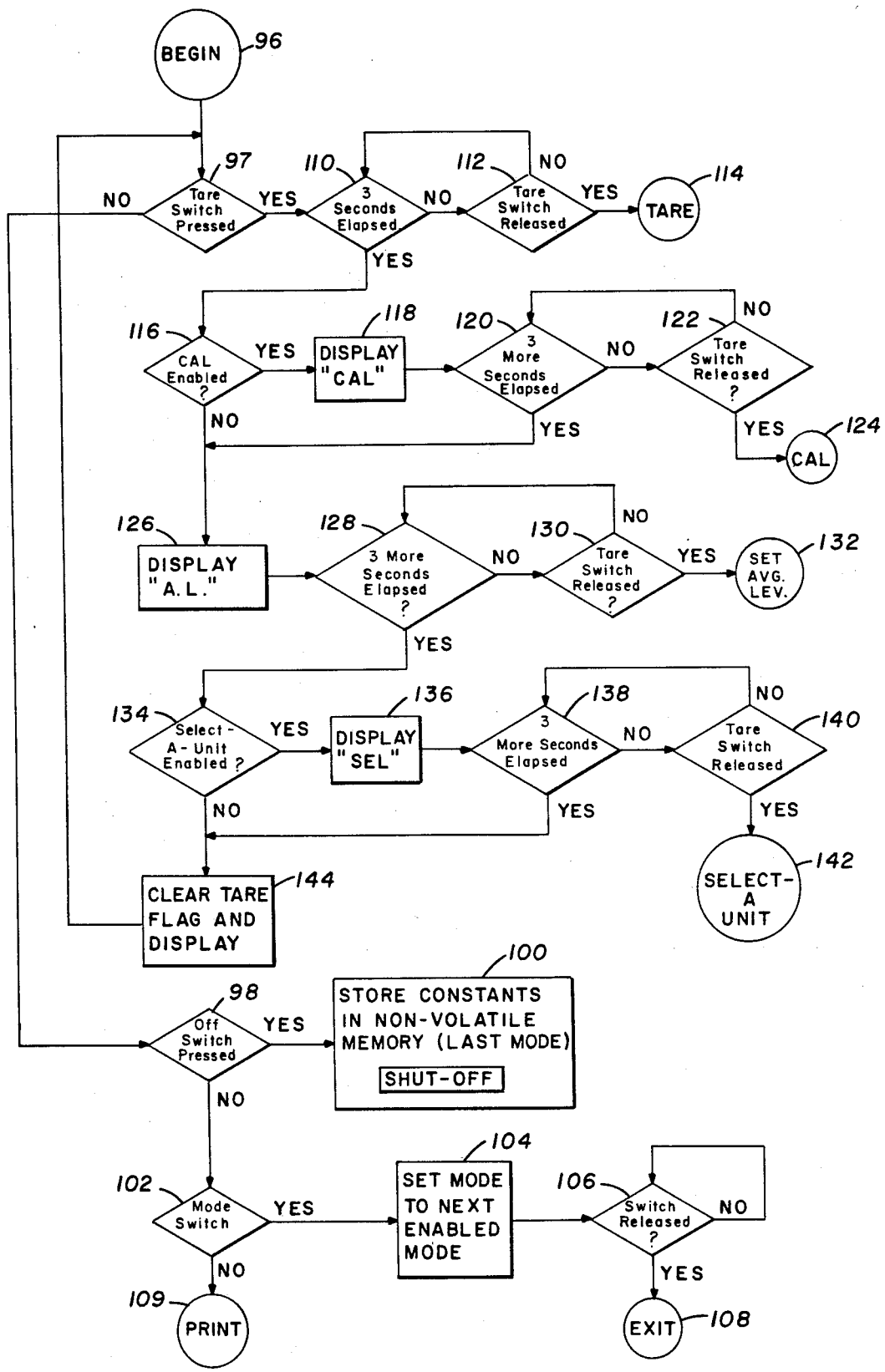

FIGS. 4–9 and FIG. 9A show flow charts representing circuitry which processes the functions of the front panel switches. Such processing begins at block 96 in FIG. 4. At block 97, the circuitry checks to see if the tare button is being pressed. If not, the circuitry checks to see if the OFF button 12 is being pressed at block 98. If the OFF button is being pressed, at block 100, constants relating to the averaging level of the balance and the mode in which the balance was last operating are stored in the nonvolatile memory and the balance is shut off. If the OFF button is not being pressed when the check of block 98 is made, then a check is made whether the MODE button 10 is being pressed at block 102. If the MODE button is not being pressed at that time, the circuitry enters a print routine at block 109. If the MODE button is being pressed, the balance enters the next mode in the menu of modes available to the user of the balance as described above. The routine of FIG. 4 is exited at block 108 when block 106 determines that the MODE button has been released.

If it is found at block 97 that the tare button is being pressed, a decision is made by block 110 in conjunction with block 112 whether the tare button has been pressed continuously for a predetermined time, for example, three seconds. If not, then the circuitry enters a tare routine 114. If the tare button is pressed continuously for the predetermined time, then the internal switches 38 are sampled at block 116 to ascertain whether or not a calibration routine for the balance is available to the operator through the front panel switches. If so, an indication that the balance is in a calibration mode is displayed on the balance's display at block 118. After the display that the balance is entering a calibration routine, blocks 120 and 122 check to see if the tare button is being pressed for another predetermined time, for example, three seconds. If the tare button is released before the predetermined time has elapsed, then the balance enters the calibration routine 124.

If the calibration routine is not available through the front panel switches or if the tare button is depressed for more than the second predetermined time, the balance displays an indication at block 126 that the balance is in a condition in which the operator may change the level of filtering provided by the digital filter described above. Blocks 128 and 130 determine whether or not the tare button is pressed for a predetermined time after the display indicates the balance's filtering level may be changed. If the tare button is released before the expiration of such predetermined time, then the balance performs a routine 132 which permits the operator to change the level of filtering.

If the tare button is not released before the expiration of the predetermined time, then a check of the internal switches 38 is made at block 134 to ascertain if a unit selection function is available to the user through the front panel switches. Such unit selection permits the user to select a subset of the available units in which the balance is able to display weight. Such subset of available units will be the only units able to be accessed through the MODE button 10 during regular weighing operations. If unit selection is available through the front panel switches, then an indication of such is made through the balance's display at block 136. Blocks 138 and 140 determine whether the tare button is pressed longer than a predetermined time after the indication is made at block 136. If the tare button is released before the expiration of that time period, the balance enters a unit selection routine 142 in which the user of the scale may determine which units of weight will be available through the MODE button for displaying weight related data during normal weighing operations.

If the unit selection function is not available through the front panel buttons as indicated by the condition of the internal switches 38 or if the tare button is pressed longer than the predetermined time after the display of block 136, then a tare flag is cleared at block 144 and the circuitry returns to the input of block 97.

Figures 5, 6:
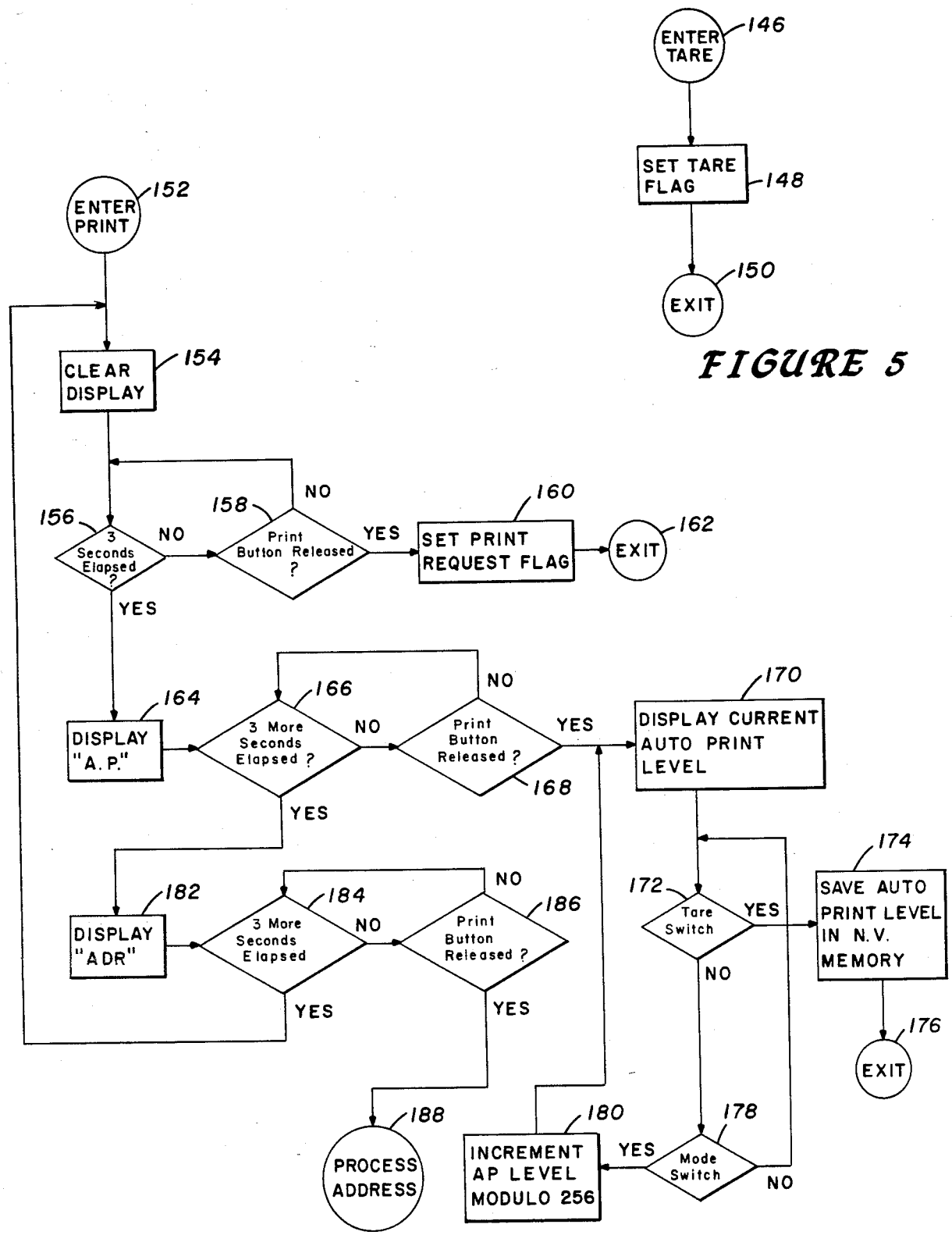

FIG. 5 shows a flow chart of the tare routine. The routine is entered at block 146. At block 148, a tare flag is set. Setting of this flag causes the balance to store a tare value related to the current output of the weight transducer such storage occurring between blocks 84 and 86 in FIG. 3. This stored value is subtracted in block 66 from weight related values obtained in subsequent weighing operations to obtain values related to the weight added to the balance after it has been tared.

This is particularly useful in a situation where it is desired to measure the weight of the contents of a container. An empty container is first placed on the weight receiver and the balance is tared. Next, the container is filled with an item such as a liquid or granular material not conveniently placed alone on the weight receiver for which it is desired to ascertain the weight. The balance then subtracts the tare value from the gross weight to obtain the net weight of the contents of the container. The tare function is also useful for zeroing the balance, that is, for cancelling the effects on weight measurements of the weight receiver and the connections of that weight receiver to the transducer.

FIG. 6 shows a flow chart of the print routine of FIG. 4. The print routine is entered at block 152 and the display is cleared at block 154. Blocks 156 and 158 determine if the PRINT switch 8 is being pressed continuously for a period of time greater than a predetermined time, for example, three seconds. If the PRINT switch is released before the expiration of the predetermined time, then a print request flag is set in block 160 and the print routine is exited at block 162. Setting of the print flag enables weight related data to be sent to a peripheral device 46 external to the balance over a serial data communications channel via the interface 44.

If the PRINT button is pressed longer than the predetermined time, then the balance displays an indication (referred to as "auto print level" in FIG. 6) at block 164 that the rate at which the weight related data is sent over the data communications channel may be set by the balance operator. Blocks 166 and 168 determine whether the PRINT button is being continuously depressed for a predetermined time after the appearance such indication on the display. If the PRINT button is released prior to the expiration of such predetermined time, then the current auto print level is displayed at block 170. The auto print level may be from 1 to 255 signifying the number of display updates between the repeated sending of weight related data over the communications channel. This amounts to transmission rates from once every three minutes to virtually continuously when the hardware described above is used. A zero auto print level defeats the auto print feature.

Block 172 checks if the tare switch is pressed. If so, the current auto print level is stored in the nonvolatile memory 34 by block 174 and the print routine is exited at block 176. If the tare switch is not pressed, block 178 checks if the MODE switch 10 is pressed. If not, the sequence returns to the input of block 172. If the MODE switch is pressed, then the auto print level is incremented by one and is displayed at block 170. In this way, the user can cycle the balance through all auto print levels until a desired level is reached.

If after the display of the availability of the auto print routine at block 164, the PRINT button is pressed for more than the predetermined time as determined by blocks 166 and 168, the balance circuitry at block 182 displays an indication that the balance is entering an address setting routine. This routine allows the user of the balance to set an address of the balance which uniquely identifies the balance to a host computer when the balance is used in a multiple balance arrangement in which all the balances communicate with the host computer over a single communications channel.

The address of the balance may be set from 0–32. After displaying entry into the address setting routine at block 182, blocks 184 and 186 check if the PRINT switch 8 is pressed for more than a predetermined time after such display. If not, the print routine returns to the input of block 184. If the PRINT switch is released before the expiration of the time period, then an address setting routine 188 is entered as more fully described in FIG. 8.

FIG. 7 shows the averaging level setting routine 132 of FIG. 4. The routine is entered at block 190. At block 192, the current averaging level is displayed by the balance. Block 194 determines whether the tare switch is pressed. If so, at block 196, the current averaging level is stored in nonvolatile memory 34 and is used by the balance in the digital filter mentioned above and described fully below.

If the tare switch is not pressed, block 200 checks if the MODE switch is pressed. If not, the sequence loops back to the input of block 194. If the MODE switch is pressed, the current averaging level is incremented by one in block 202 and the sequence returns to block 192 at which point the new averaging level is displayed. If the current averaging level is the maximum available averaging level, then the incrementation in block 202 causes a wraparound to the lowest averaging level and a display of the lowest averaging level as the new averaging level.

In the preferred embodiment of the invention, there are three averaging levels signifying three different levels of user selected filtering of the output of the transducer. As discussed below, the filtering is further refined by taking into account the different operational conditions of the balance and by varying the digital filtering in response to changes in those operational conditions. In the preferred embodiment, the operational conditions taken into account are the resolution of the balance's weight display and its stability.

FIG. 8 is a flow chart of the address setting routine of the balance. The routine is entered at block 204. The current address of the balance is displayed at block 206. Block 208 checks if the tare switch is pressed. If so, the current address is stored in the nonvolatile memory 34 at block 210 and the routine is exited at block 212. If the tare switch is not pressed, block 214 checks if the MODE switch is pressed. If not, the sequence returns to the input of block 208. If the MODE switch is pressed, the address is incremented at block 215 and the new address is displayed at block 206. If the current address is the maximum available address, then the incrementation in block 215 causes a wraparound to the lowest available address and a display of the lowest available address as the new address. In the example of FIG. 9, 32 unique addresses are available for the balance.

FIG. 9 is a flow chart of the beginning of calibration routine 124. The routine is entered at block 216. Next, block 218 sets a calibration request flag and clears xdata and ydata flags, if linearity calibration is available through the front panel switches. If linearity calibration is not available through the front panel switches, then the xdata flag is cleared and the ydata flag is set. The routine is exited at block 220. See FIG. 12 for the remainder of the calibration routine.

Figure 9A:
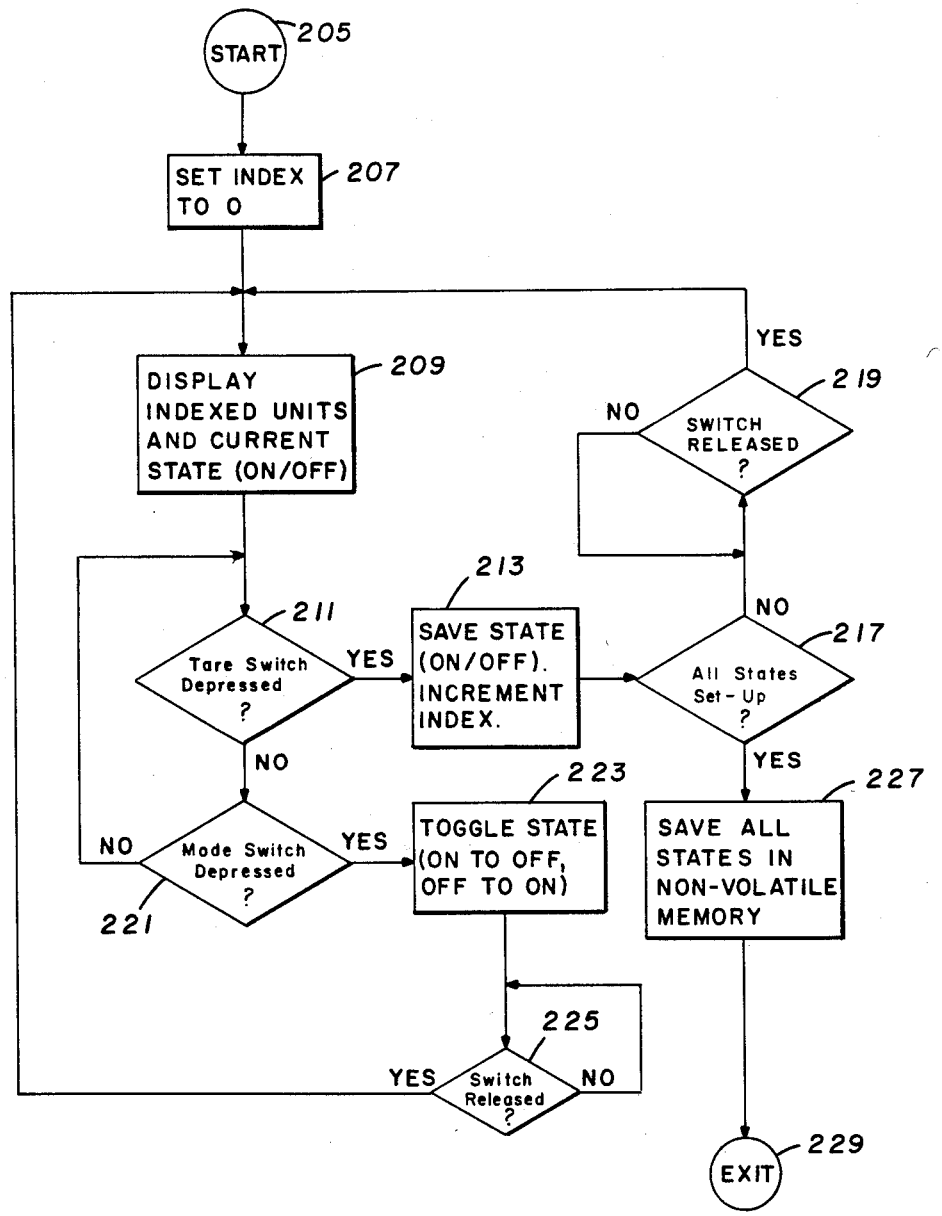

FIG. 9A is a flow chart representing circuitry which performs the unit selection routine 142 of FIG. 4. The routine of FIG. 9A is entered at block 205. At block 207, an index is set to zero. The index is a number representing one of the weighing units in which the balance may display weight. There is one unique index number for each possible weighing unit.

At the beginning of the routine of FIG. 9A, the index is set to the first available weighing unit. At block 209, an indication of the weighing unit that is represented by the number to which the index is currently set is displayed. Also, an indication is displayed relating to whether or not the displayed unit is to be available through the MODE switch during normal weighing operations (referred to as the on/off state in FIG. 9A).

Block 211 then checks to see if the tare switch is being pressed. If so, the state of the displayed units is stored in memory 32 and the index is incremented at block 213. A check is then made at block 217 to see if the states of all possible units have been stored. If not, a check is made to see if the tare switch has been released. If so, the routine returns to the input of block 209 with the index incremented by one. If the tare switch has not been released, then the routine loops back to the input of block 219 until it is released. Continued pressing and releasing of the tare switch stores the current on/off state associated with each of the available units.

If instead of the tare switch the MODE switch is pressed as determined by blocks 211 and 221, block 223 toggles the on/off state of the current index. This is the means by which the user of the balance may change the availability through the MODE switch during normal operation of the balance of any of the possible units.

Block 225 checks to see if the MODE switch is released and if it is released the routine returns to the input of block 209. If not, the routine loops back to the input of block 225 until the switch is released.

Once all of the index values have been assigned on/off states in accordance with the wishes of the user of the balance, as determined by block 217, then all states are stored in nonvolatile memory at block 227 and the routine is exited at block 229. As discussed above, the on/off state associated with each index value in nonvolatile memory determines whether or not the units associated with each index value are available through the MODE switch during normal operations.

Figure 10:
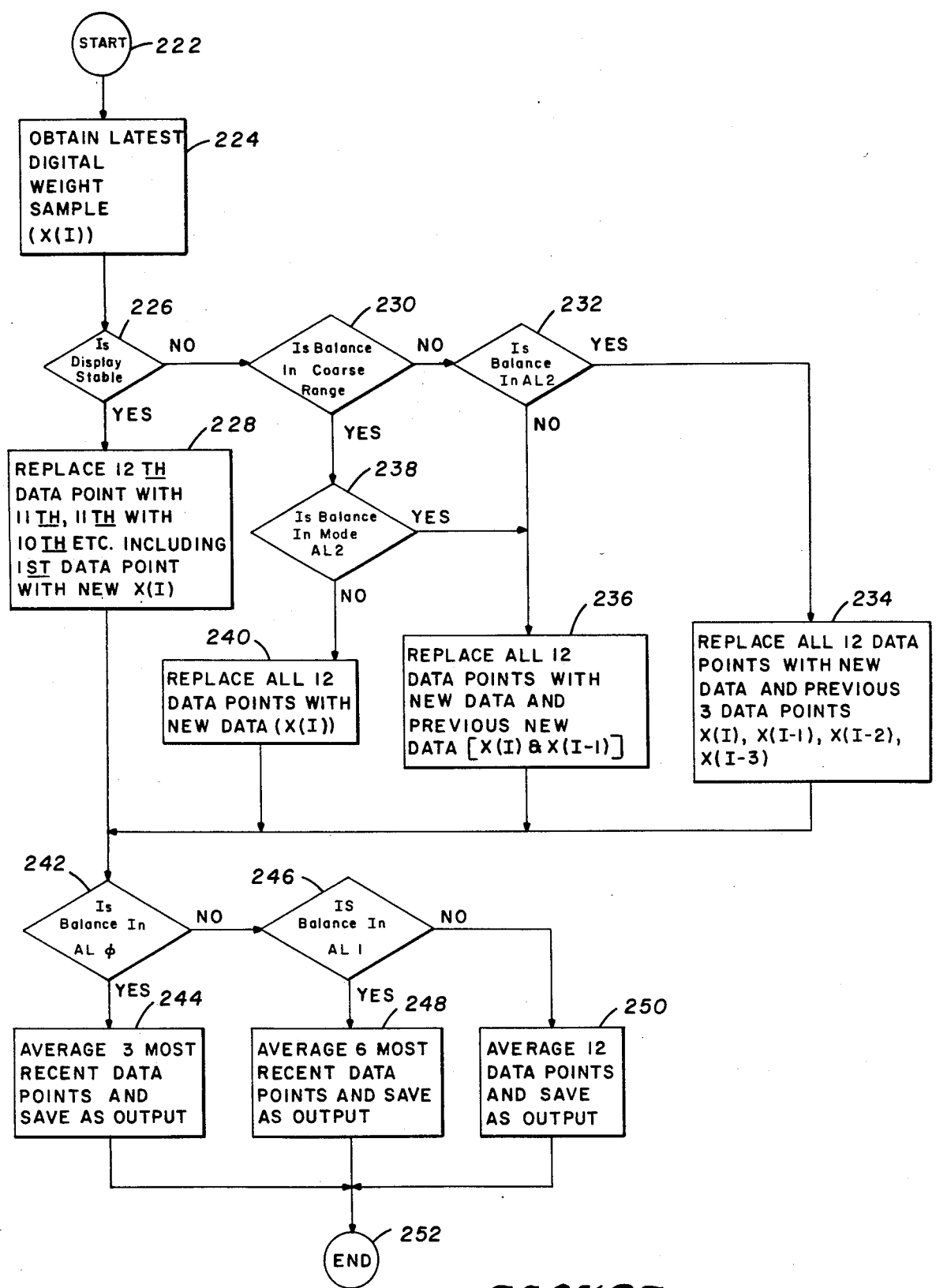
FIG. 10 is a flow chart representing the digital filter of this invention.
Figure 11:
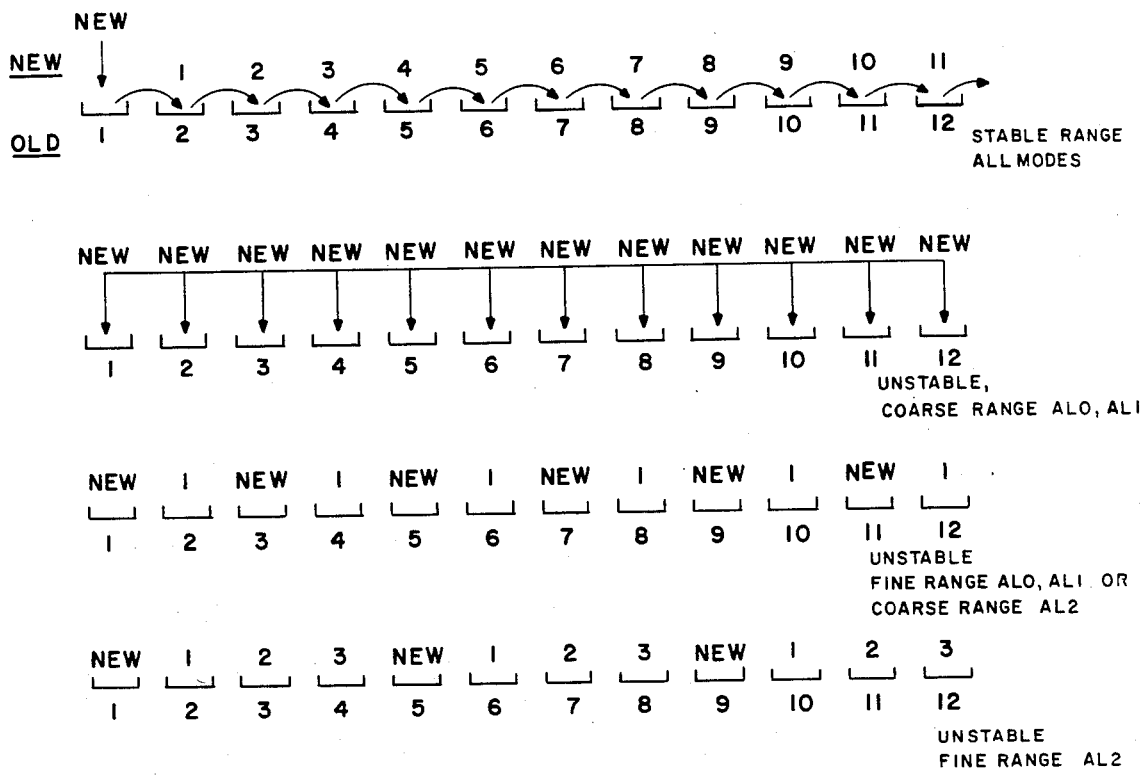
FIG. 11 is an illustration of the operation of the digital filter of the invention.
Figure 11:
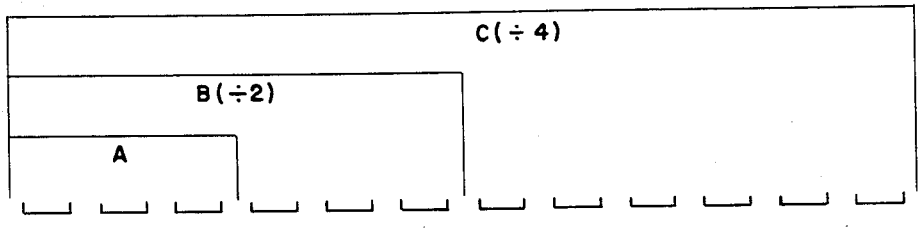

FIG. 10 is a flow chart representing circuitry in the balance which digitally filters the raw output of the weight transducer so that a stable display of weight may be achieved despite mechanical and other disturbances which may affect the weight receiver. FIG. 11 is an illustration of the sequence of operations occurring in memory and the averaging operation performed on the contents of the memory locations.

The digital filtering circuitry is located in the microprocessor system of FIG. 2. The digital filter repetitively samples the magnitude of the output of the analog to digital converter 26 and stores predetermined ones of the sampled magnitudes. The sampling may occur once every 300 to 800 milliseconds, for example.

Averaging circuitry computes a weighted average of predetermined ones of the sampled magnitudes. The weighting of the predetermined ones of the sampled magnitudes in the average may vary depending on the desires of the balance operator or the conditions under which the balance is operating, of both. In a preferred embodiment described in this application, the operator of the balance may set a desired filtering level through the manipulation of the front panel switches described above. Also in the preferred embodiment, the conditions of the balance to be taken into account by the digital filter include the stability of the weight display and the resolution of that display. In this manner, adequate filtering of the transducer output is accomplished along with a stable weight display and rapid response to changes in weight on the weight receiver.

In the example of FIGS. 10 and 11, the balance displays weight in a low or coarse resolution mode and a high or fine resolution mode. In that example, the user may select three averaging levels, a low averaging level AL0, an intermediate averaging level AL1, and a high averaging level AL2. AL0 gives a low amount of filtering, AL1 gives an intermediate amount of filtering, and AL2 gives a high amount of filtering. The digital filter of FIGS. 10 and 11 ascertains whether the display of weight is stable, the resolution mode in which the balance is displaying weight, and the averaging level selected by the operator. It adjusts the filtering in accordance with its findings.

The filtering routine begins at block 222. At block 224 the filtering circuitry obtains the latest digital weight sample from analog to digital converter 26. Block 206 determines whether the weight display is stable. Stability may be defined as a predetermined number of consecutive weight displays within a predetermined number of least significant digits of each other. For example, stability may be defined as three consecutive weight displays within one least significant digit of each other.

In the case when the display meets the stability criterion of block 226, which previously was actually determined in block 84 in FIG. 3, the microprocessor stores in memory a predetermined number of the most recent consecutive sampled magnitudes. In the example of FIGS. 10 and 11, the twelve most recent consecutive sampled magnitudes are stored in memory by the microprocessor. For convenience of description, the memory locations in which those magnitudes are stored are referred to as locations 1 to 12 in FIG. 11. Those memory locations contain in numerical sequence the consecutive sampled magnitudes, location 1 containing the most recent sampled magnitude and location 12 containing the earliest sampled magnitude. Each time a sampled magnitude is obtained, it is placed in memory so that it replaces the most recent prior sampled magnitude. The most recent prior sampled magnitude is written into the location of the second most recent prior sampled magnitude and so on until the twelve memory locations contain a sampled magnitude which was contained in the next lower numbered memory location before the sampled magnitude was obtained. In other words, the sampled magnitude contained in memory location 12 is replaced with the sampled magnitude in memory location 11, the sampled magnitude contained in memory location 11 is replaced with the sampled magnitude contained in memory location 10, and so on until the sampled magnitude contained in memory location 1 is replaced with the new sampled magnitude. The sampled magnitude previously contained in memory location 12 is discarded. In this manner, the sampled magnitudes roll through the memory locations as new weight data is obtained, as illustrated at block 228.

If it is determined at block 226 that the display is not stable, a different approach is taken when a new sampled magnitude is acquired depending on the resolution in which the balance is displaying weight and the averaging level to which the user has set the balance. If the balance is not displaying weight in the coarse range and the user has selected averaging level AL2, as determined at blocks 230 and 232, the filter replaces the contents of memory locations 1-4 with the three most recent sampled magnitudes and the new sampled magnitude, respectively. The contents of memory locations 5-8 and the contents of memory locations 9-12 each are likewise replaced with those four sampled magnitudes.

If balance is not displaying weight in the coarse range and the user has selected averaging level AL0 or AL1, as determined by blocks 230 and 232, or if the balance is displaying weight in the coarse range and the user has selected averaging level AL2, as determined by blocks 230 and 238, then at block 236 the filter replaces the contents of memory locations 1-2 with (a) the most recent sampled magnitude taken prior to acquiring the new sampled magnitude and (b) the new sampled magnitude, respectively. The contents of memory locations 3 and 4, the contents of memory locations 5 and 6, the contents of memory locations 7 and 8, the contents of memory locations 9 and 10, and the contents of memory locations 11 and 12 each are likewise replaced with those two sampled magnitudes.

If the balance is displaying weight in the coarse range and the user has selected averaging level AL0 or AL1, as determined at blocks 230 and 238, then at block 240 the filter replaces the contents of all twelve memory locations with the new sampled magnitude.

Once the contents of the twelve memory locations have been been determined after the acquisition of a new sampled magnitude as described above, the averaging level selected by the user is again determined at blocks 242 and 246. If the user has selected the minimum filtering level AL0, then the filter averages the three most recent data points (the contents of memory locations 1-3) as illustrated at blocks 244. This is illustrated as a three point average A in FIG. 11. If the user has selected the intermediate level of filtering AL1, then the filter averages the six most recent data points (the contents of memory locations 1-6) as illustrated at block 248. This is illustrated as a six point average B in FIG. 11. If the user has selected the highest level of filterig AL2, then the filter averages all twelve data points as shown at block 250. This is illustrated as a 12 point average C in FIG. 11.

In all cases, the average value determined at blocks 244, 248, and 250 are stored and provided as averaged data at the output of block 56 in FIG. 3. The filtering routine is exited at block 252.

Figure 12:
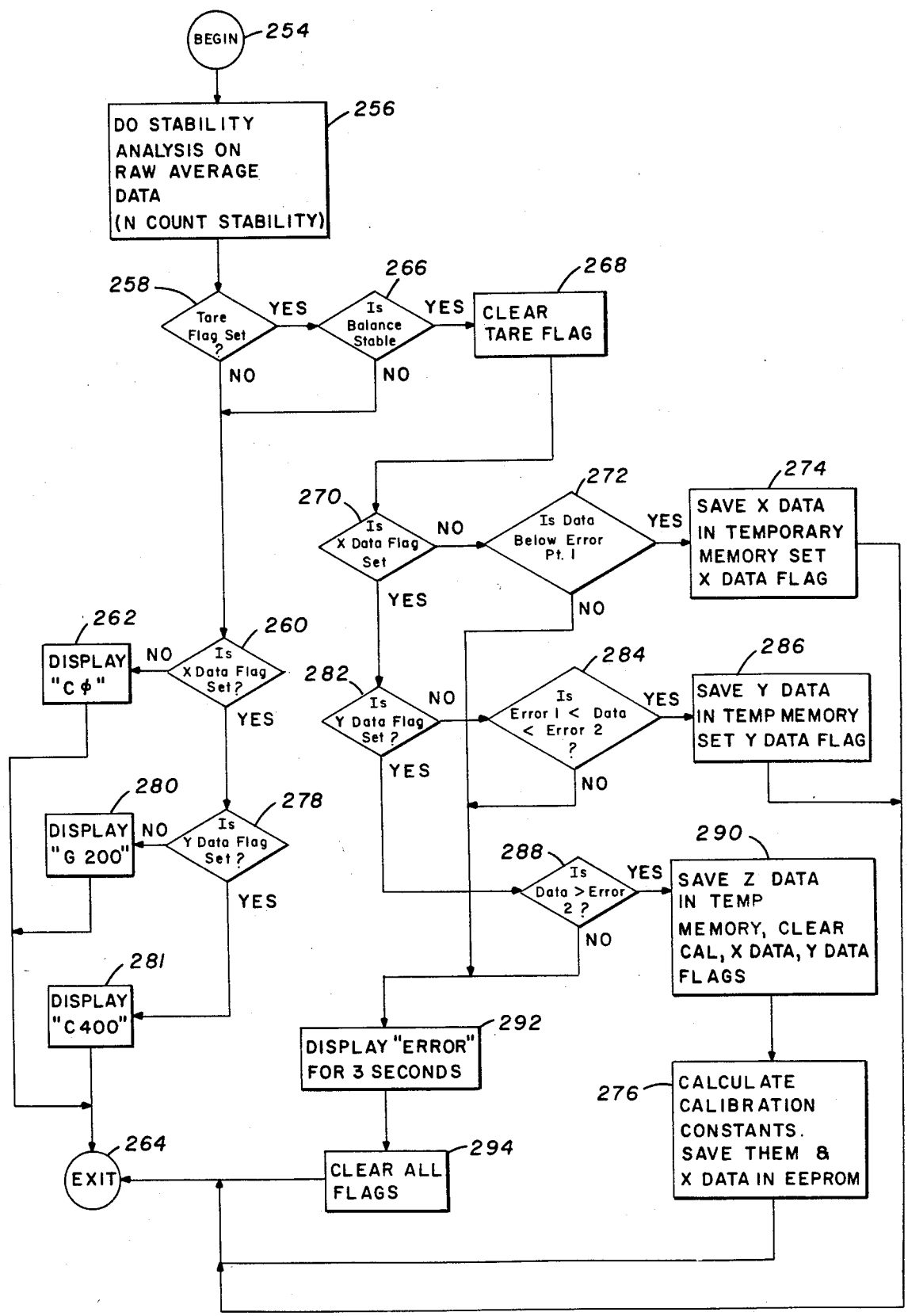
FIG. 12 is a flow chart representing the calibration routine performed by the balance to ascertain the linearity and span constants for a transducer used in the balance.

The weight placed on the weight receiver is not a linear function of the output of the weight transducer. To a first approximation, the weight is a quadratic function of the transducer output. In other words, the weight approximates the value $ax^2+bx+c$ where x is the transducer output and a, b, and c are constants. FIG. 12 is a flow chart representing circuitry in the balance of this application which allows the transducer to be calibrated while it is in the balance. The balance is calibrated by ascertaining the constants a, b, and c and storing them for later use in calculating the weight on the platform from the transducer output.

In a preferred embodiment, the relationship between weight and transducer output is considered to be the following:

$$\text{Weight} = [(x + x^2/k_{lin})k_{span}] - \text{Tare}$$

The routine of FIG. 12 determines the linearity constant $k_{lin}$, the span constant $k_{span}$, and the tare value Tare in the equation above.

The calibration routine begins at block 254. In block 256, stability analysis is performed on the raw averaged data from block 56. If the tare flag is not set as determined at block 258, then a check is made to see if the xdata flag is set at block 260. If it is not, the circuitry tells the user through the display that the balance is in the calibration mode and to place a weight of zero on the weight receiver. At this point, the calibration routine is exited at block 264 and the sequence returns to the main sequence in FIG. 3. Because the calibration request flag has been set by the original entry into the calibration routine (see FIG. 10), the sequence of operations again returns to the calibration routine at block 254. The display remains unchanged until the tare switch is pressed and the tare flag is set. When the tare flag is set, a check is made at block 266 to see if the balance is stable. When the balance is stable, the tare flag is cleared at block 268 and a check is made at block 270 to see if the xdata flag is set. If not, a check is made at block 272 to see if the output of the transducer with no weight on the weight receiver (xdata) is below a first predetermined error value. If so, the xdata value is saved in temporary memory 32 at block 274. The xdata flag is set by block 274. The calibration routine is exited via block 264.

After the xdata flag is set in block 274, the balance displays via blocks 254, 256, 258, 260, 278, and 280 the weight of a first known calibration weight which the user is to place on the weight receiver. As shown in FIG. 12, the first calibration weight may weigh 200 weighing units. In balances displaying weight to a single resolution, the first calibration weight should weigh about half way between zero and the maximum capacity of the balance. In balances having fine and coarse ranges of weight display, the first calibration weight should have a weight which is the maximum capacity of the fine range.

If the tare switch is pressed and the balance is stable, the tare flag is once again cleared at block 268. Because the xdata flag has been set as determined by block 270, block 282 determines whether the ydata flag is set. If not, block 284 determines if the transducer output is between the first predetermined error value and a second predetermined error value. If so, then the output of the transducer (ydata) is stored in memory 32 at block 286. The ydata flag is set in block 286. The calibration routine is exited via block 264.

After the xdata and ydata flags have been set and the xdata and ydata values have been stored in memory, the balance then displays the weight of a second known calibration weight to be placed on the weight receiver via blocks 254, 256, 258, 260, 278, and 281. As shown in FIG. 12, the second calibration weight may weigh 400 weight units. Its weight preferably equals the full scale capacity of the balance. When the second calibration weight is placed on the weight receiver and the tare switch is pressed, thus setting the tare flag, balance stability is again checked at clock 268 and, when the balance is stable, the tare flag is again cleared at block 268. Because the xdata and ydata flags are now set, block 288 may determine whether the transducer output with the second calibration weight is greater than the second predetermined error value. If so, the transducer output (zdata) is stored in memory 32 at block 290. Block 290 clears the calibration request, xdata, and ydata flags.

Block 276 computes the calibration constants from the xdata, ydata, and zdata values and from the known weights applied to the weight receiver during the calibration operation. In effect, three simultaneous equations in three unknowns are produced by putting three known weights on the weight receiver (0, 200, and 400 units in the example of FIG. 12) and measuring the resultant transducer output. Enough information is obtained to calculate the three unknowns (a, b, and c in the general equation above or $k_{lin}$, $k_{span}$, and Tare in the preferred embodiment). Once the calibration constants are calculated, they are stored in program memory 30 and later on they are stored in nonvolatile memory 34. After the operations in block 276, the calibration routine is exited at block 264 and the sequence of operations returns to the main sequence in FIG. 3. The sequence of operations does not return to the calibration routine until the calibration request flag is again set by the user placing the balance in the calibration mode as described above.

If the xdata, ydata, or zdata values do not have the relationships with the first and second error values specified by blocks 272, 284, and 288, then an error message is displayed for a predetermined time through display 42 at block 292. All flags are cleared at block 294 and the calibration routine is exited at block 264. Recalibration of the balance is thus prevented and calibration constants determined prior to attempting to recalibrate the balance are maintained in memory and used in weighing operations.

Figure 13:
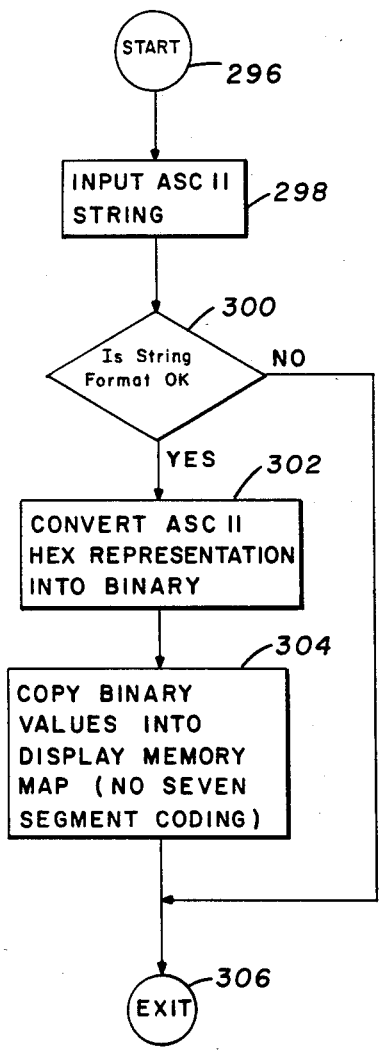
FIG. 13 is a flow chart representing circuitry for displaying information presented to the balance via an RS-232 interface in the balance.

FIG. 13 is a flow chart representing circuitry in the balance permitting a host computer or other external processing means to transmit messages over a serial data communications channel through the interface 44 of the balance and to display those messages to the user of the balance through the display 42. The routine of FIG. 13 begins at block 296. A string of ASCII coded data is input to the balance interface at block 298. The format of the data is checked at block 300. If the data is not in proper format, the routine of FIG. 13 is exited at block 306. If the format of the data is in proper form, the ASCII data is converted into binary form at block 302. The binary data is copied into a display memory map and fed to the display. There is no seven segment coding of the data because the data is fed directly into the display.

Figure 14:
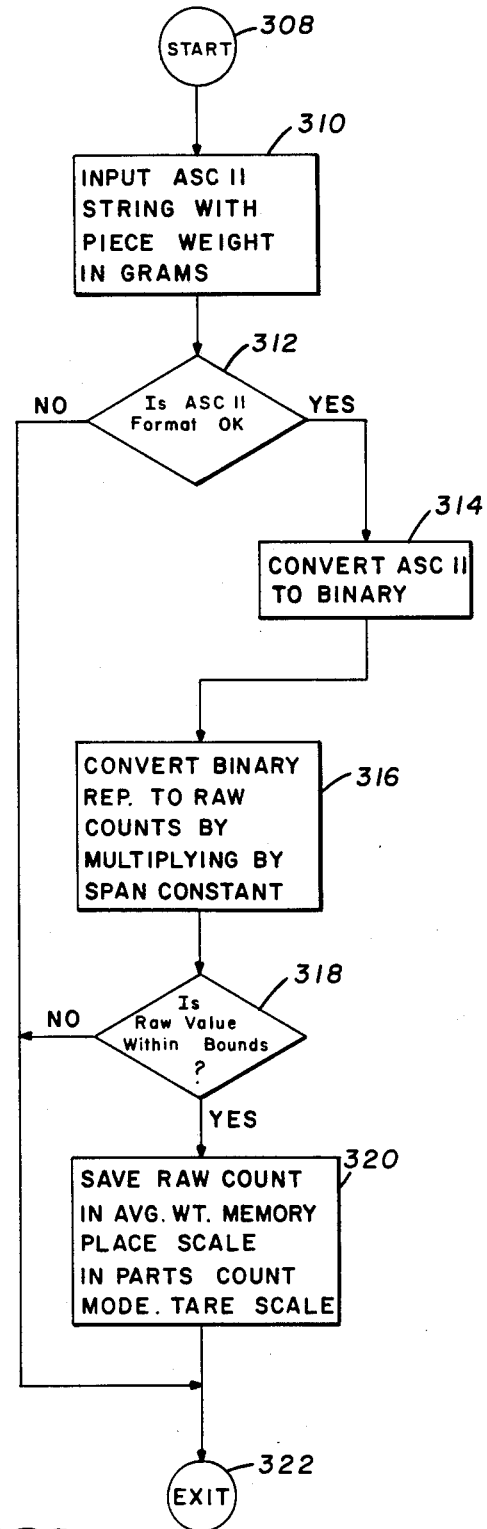
FIG. 14 is a flow chart representing circuitry in the balance for loading preselected piece weight values into the balance via the RS-232 interface.

FIG. 14 is a flow chart representing circuitry in the balance permitting a host computer or other external processing circuitry to transmit piece weight data to the balance. Such piece weight data is used by the balance in the parts counting mode and indicates the weight of a single one of a number of uniform weight items to be weighed. An unknown number of such items are placed on the weight receiver and the balance computes and displays the number of items placed on the weight receiver in light of the transducer output and the piece weight data.

The routine of FIG. 14 begins at block 308. At block 310, a string of ASCII coded data related to the piece weight in predetermined units is sent from the external processor over the data communications channel to the balance interface 44. The format of the string of data is checked at block 312. If the data is in proper form, it is converted from ASCII form to binary form at block 314. The binary data from block 314 is converted to raw counts at block 316 by multiplying the binary data by the span constant stored in memory. A check is made at block 318 to see if the raw value from block 316 is within predetermined bounds. If so, block 320 stores the raw count in a memory location reserved for storage of piece weight values, places the balance in the parts counting mode, and tares the balance. The routine of FIG. 14 is exited at block 322 when the operations of block 320 have been completed. The routine of FIG. 14 is also exited at block 322 when the ASCII string received from the external processor is not in proper form as determined at block 312 or the raw counts produced by block 316 are not within the bounds specified by block 318.

Figure 15:
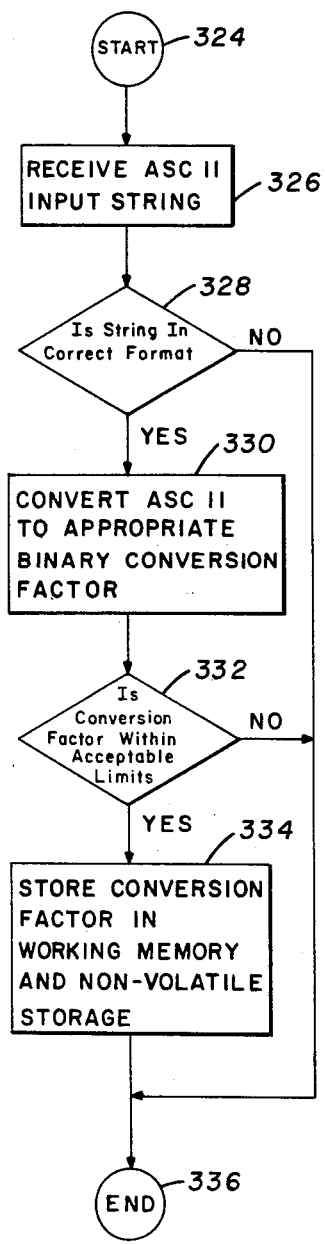
FIG. 15 is a flow chart representing circuitry in the balance which allows loading of custom conversion factors into the balance via the RS-232 interface.

FIG. 15 is a flow chart representing circuitry in the balance permitting a host computer or other external processing circuitry to down load data on a data communications channel into the balance interface 44, such down loaded data relating to a custom unit conversion factor. Such factor permits the balance to display weight in units not a part of the menu of weighing units available through the MODE switch 10 on the front panel of the balance. The MODE switch permits the balance to enter a custom units mode in which the custom unit conversion factor is applied to the signal obtained from the transducer so that the display 42 indicates weight in custom units selected by the user of the balance.

The routine of FIG. 15 begins at block 324. A string of ASCII coded data related to a desired custom unit conversion factor is received by the balance interface 44 at block 326. Block 328 checks to see if the data is in the proper format. If so, the data is converted to binary format at block 330. Block 332 checks to see if the binary conversion factor produced at block 330 is within acceptable limits. If so, the custom units conversion factor is stored at block 334 in working memory 32 and nonvolatile memory 34. After such storage, the routine of FIG. 15 is exited at block 336. If the format of the ASCII data string is not proper as determined at block 328 or if the conversion factor is not within acceptable limits as determined at block 332, then the routine of FIG. 15 is also exited at block 336.

Figure 16:
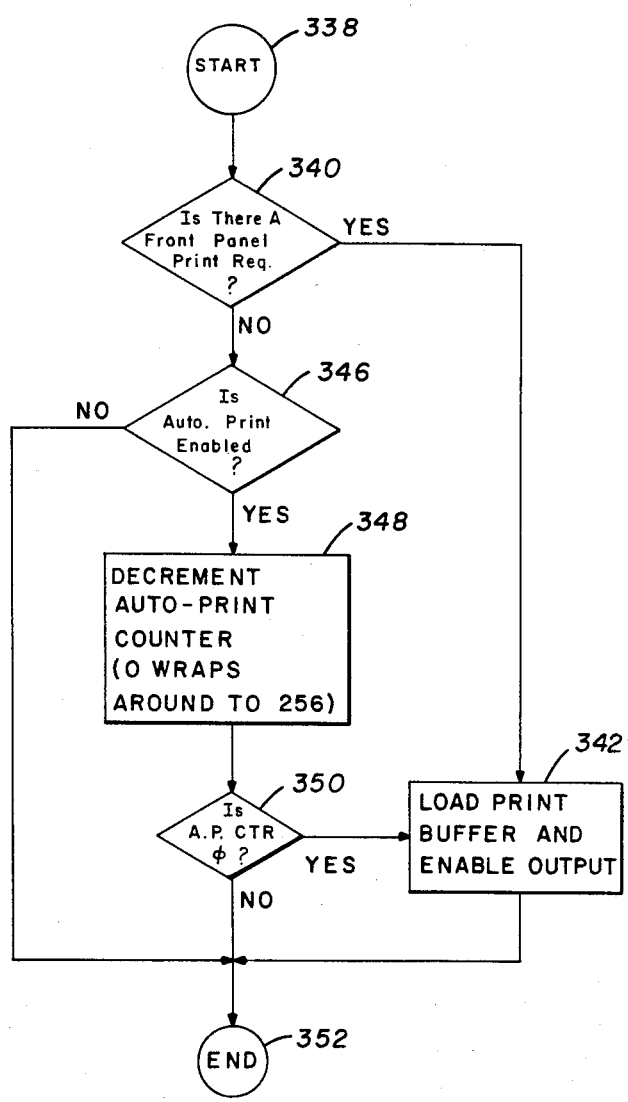
FIG. 16 is a flow chart representing circuitry in the balance for sending data from the balance to circuitry external to the balance via the RS-232 interface.

FIG. 16 is a flow chart representing circuitry in the balance for accomplishing a print function and an auto print function alluded to above. The routine of FIG. 16 begins at block 338. At block 340, it is determined whether or not the front panel PRINT switch 8 is pressed. If so, at block 342, a print buffer in the interface 44 is loaded with the latest weight related data stored in the balance and a print output is enabled thus sending the weight related data to a peripheral device over a data communications channel. The routine of FIG. 16 next is exited at block 352 at the completion of the operation of block 342.

If the PRINT switch is not pressed as determined at block 340, then a check is made at block 346 as to whether the auto print function has been enabled by the setting of the internal switches 38. If so, an auto print counter is decremented at block 348 and a check is made at block 350 to determine if the auto print counter has been decremented to zero. If it has been so decremented, then the print buffer is loaded with weight related data, the print output is enabled as before, and the counter is reloaded wtih its original starting count determined by the user in the auto print routine. If the auto print function is not enabled or the auto print counter is not decremented to zero when auto print has been enabled, then the routine of FIG. 16 is likewise exited at block 352.

I claim:

1. An electronic balance, comprising:
a weight receiving means;
a transducer means responsive to the weight receiving means for producing a digital signal related to a weight placed on the weight receiving means;
a signal processing means responsive to said transducer means;
said processing means including a digital filter means responsive to the digital signal from the transducer means, the digital filter comprising:
a means for repetitively sampling the magnitude of the digital signal at preselected times;
a means for storing predetermined ones of the sampled magnitudes;
an averaging means for generating a signal related to a weighted average of predetermined ones of the stored magnitudes;
a manual data entry means for entering a desired level of filtering into the processing means; and
a means responsive to the manual data entry means and to selected operational conditions of the balance for selecting which predetermined ones of the stored magnitudes are used by the averaging means and the weight assigned to each selected magnitude in the average; and
means responsive to the signal related to the weighted average of predetermined ones of the stored magnitudes for displaying an indication related to the weight placed on the weight receiving means.

2. The balance of claim 1, wherein said display means can display said weight related indication to a plurality of predetermined resolutions;
wherein said processing means has a means for selecting the resolution to which said display means displays the weight related indication; and
wherein said selection and weighting means is responsive to said resolution selecting means.

3. The balance of claim 2, further comprising:
a means for determining whether the balance is stable;
wherein the selection and weighting means is responsive to the stability determining means.

4. The electronic balance of claim 3, further comprising:
a linearization means responsive to the averaging means for producing signals related to data to be used for linearizing the output of the transducer means.

5. The electronic balance of claim 1, further comprising:
a linearization means responsive to the averaging means for producing signals related to data to be used for linearizing the output of the transducer means.

6. An electronic balance, comprising:
a weight receiving means;
a transducer means responsive to the weight receiving means for producing a digital signal related to a weight placed on the weight receiving means;
a means for repetitively sampling the magnitude of the digital signal produced by the transducer means at preselected times;
a means for storing predetermined ones of the sampled magnitudes;
an averaging means responsive to the storing means for producing a signal related to a weighted average of predetermined ones of the stored magnitudes; and
a means for varying the weighting of each sampled magnitude in the weighted average.

7. The electronic balance of claim 6, in which the varying means is responsive to an operational condition of the balance.

8. The electronic balance of claim 7, in which the operational condition is the resolution to which the balance is to display weight.

9. The electronic balance of claim 7, in which the operational condition is the stability of the balance.

10. The electronic balance of claim 9, in which the operational condition is the resolution to which the balance is to display weight.

11. The electronic balance of claim 10, in which the varying means is responsive to a manual data entry means for entering into the balance a level of filtering desired by the operator of the balance.

12. The electronic balance of claim 11, further comprising:
a linearization means responsive to the averaging means for producing signals related to data to be used for linearizing the output of the transducer means.

13. The electronic balance of claim 6, in which the varying means is responsive to a means for entering a desired level of filtering.

14. The electronic balance of claim 6, further comprising:
a linearization means responsive to the averaging means for producing signals related to data to be used for linearizing the output of the transducer means.

15. An electronic balance, comprising:
a weight receiving means;
a transducer means responsive to the weight receiving means for producing a digital signal related to a weight placed on the weight receiving means;
a means for repetitively sampling the magnitude of the digital signal produced by the transducer means at preselected times;
a means for storing predetermined sampled magnitudes, each of the predetermined sampled magnitudes being stored in a predetermined number of locations in the storing means;
a means for averaging the contents of predetermined storage locations in the storing means; and
a means for varying which sampled magnitudes are stored in the storing means, the predetermined number of locations in which each stored magnitude is stored, and which contents of the storing means are averaged by the averaging means.

16. The electronic balance of claim 15, in which the varying means comprises:
a means responsive to operational conditions of the balance; and
a means responsive to a means for entering into the balance a desired level of filtering.

17. The electronic balance of claim 16, in which the operational conditions of the balance are the stability of the balance and the resolution to which the balance is to display an amount of weight on the weight receiving means.

18. The electronic balance of claim 17, further comprising:
a linearization means responsive to the averaging means for producing signals related to data to be used for linearizing the output of the transducer means.

19. The electronic balance of claim 15, further comprising:
a linearization means responsive to the averaging means for producing signals related to data to be used for linearizing the output of the transducer means.

* * * * *